US009395907B2

(12) United States Patent
Chelaru et al.

(10) Patent No.: US 9,395,907 B2
(45) Date of Patent: Jul. 19, 2016

(54) METHOD AND APPARATUS FOR ADAPTING A CONTENT PACKAGE COMPRISING A FIRST CONTENT SEGMENT FROM A FIRST CONTENT SOURCE TO DISPLAY A SECOND CONTENT SEGMENT FROM A SECOND CONTENT SOURCE

(75) Inventors: Andreea Ligia Chelaru, Amsterdam (NL); Mikko Antero Nurmi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 176 days.

(21) Appl. No.: 12/860,408

(22) Filed: Aug. 20, 2010

(65) Prior Publication Data

US 2012/0047469 A1 Feb. 23, 2012

(51) Int. Cl.
*G06F 3/048* (2013.01)
*G06F 3/0488* (2013.01)

(52) U.S. Cl.
CPC .................................. *G06F 3/04883* (2013.01)

(58) Field of Classification Search
CPC ................................................... G06F 3/04883
USPC ........................................................ 715/863
See application file for complete search history.

(56) References Cited

U.S. PATENT DOCUMENTS

| 6,115,724 | A  | 9/2000  | Booker       |
|-----------|----|---------|--------------|
| 6,141,018 | A  | 10/2000 | Beri et al.  |
| 6,448,984 | B1 | 9/2002  | Smith et al. |
| 6,621,532 | B1 | 9/2003  | Mandt        |
| 6,907,580 | B2 | 6/2005  | Michelman et al. |
| 7,673,251 | B1 | 3/2010  | Wibisono     |
| 2001/0024195 | A1 | 9/2001 | Hayakawa |
| 2002/0118230 | A1 | 8/2002 | Card et al. |
| 2004/0135815 | A1 | 7/2004 | Browne et al. |
| 2005/0102638 | A1 | 5/2005 | Jiang et al. |

(Continued)

FOREIGN PATENT DOCUMENTS

| EP | 0570083 B1 | 8/1999 |
| WO | WO 0622725 A1 | 11/1994 |

(Continued)

OTHER PUBLICATIONS

International Search Report for Application No. PCT/FI2011/050708 dated Nov. 24, 2011.

(Continued)

*Primary Examiner* — Andrea Long
(74) *Attorney, Agent, or Firm* — Alston & Bird LLP (57) ABSTRACT

An apparatus may include a user interface configured to display a content package including a first content segment from a first content source. A gesture interpreter may be configured to receive a gesture input in a positional relationship to the first content segment. The apparatus may further include a content relationship manager which may be configured to determine relationships between content segments such that a content segment selector may select a second content segment relating to the first content segment from a second content source. Further, the apparatus may include a content package adaptor configured to adapt the content package to provide for display of the second content segment. In some instances the content package adaptor may adapt the content package by providing for display of a second content package, for example from a different application than an application which the first content segment is from.

19 Claims, 8 Drawing Sheets

(56) References Cited

U.S. PATENT DOCUMENTS

| | | | |
|---|---|---|---|
| 2005/0154997 | A1 | 7/2005 | Brun-Cottan et al. |
| 2005/0195154 | A1 | 9/2005 | Robbins et al. |
| 2005/0216550 | A1* | 9/2005 | Paseman et al. ............ 709/202 |
| 2006/0026521 | A1 | 2/2006 | Hotelling et al. |
| 2007/0067738 | A1 | 3/2007 | Flynt et al. |
| 2007/0073751 | A1 | 3/2007 | Morris et al. |
| 2007/0150842 | A1* | 6/2007 | Chaudhri et al. ............ 715/863 |
| 2007/0245245 | A1 | 10/2007 | Blue et al. |
| 2008/0059897 | A1 | 3/2008 | Dilorenzo |
| 2008/0062141 | A1 | 3/2008 | Chandhri |
| 2008/0282202 | A1 | 11/2008 | Sunday |
| 2009/0007017 | A1 | 1/2009 | Anzures et al. |
| 2009/0013269 | A1 | 1/2009 | Khandpur |
| 2009/0030940 | A1* | 1/2009 | Brezina et al. ............ 707/103 Y |
| 2009/0031232 | A1* | 1/2009 | Brezina et al. ............ 715/764 |
| 2009/0064055 | A1 | 3/2009 | Chaudhri et al. |
| 2009/0106659 | A1* | 4/2009 | Rosser et al. ............ 715/730 |
| 2009/0106676 | A1* | 4/2009 | Brezina et al. ............ 715/763 |
| 2009/0138475 | A1* | 5/2009 | Caulkins ............ 707/9 |
| 2009/0216806 | A1 | 8/2009 | Feuerstein |
| 2009/0234814 | A1 | 9/2009 | Boerries et al. |
| 2009/0237562 | A1 | 9/2009 | Fujiwara et al. |
| 2009/0287567 | A1 | 11/2009 | Penberthy et al. |
| 2010/0153520 | A1 | 6/2010 | Daun et al. |
| 2010/0169364 | A1* | 7/2010 | Hardt ............ 707/769 |
| 2010/0306693 | A1* | 12/2010 | Brinda ............ G06F 3/0488 715/784 |
| 2011/0099507 | A1* | 4/2011 | Nesladek et al. ............ 715/780 |
| 2012/0206497 | A1 | 8/2012 | Sarjanoja |

FOREIGN PATENT DOCUMENTS

| | | |
|---|---|---|
| WO | WO 98/48552 A1 | 10/1998 |
| WO | WO 2007/109480 A2 | 9/2007 |
| WO | WO 2008/127537 A1 | 10/2008 |

OTHER PUBLICATIONS

Colvin et al., *Viewing Email Headers,* Search Organization, Version 6 (Aug. 2005) pp. 1-15.
HTC—Products—HTC Hero—A Closer Look [online] [retrieved Sep. 4, 2014]. Retrieved from the Internet: <URL: http://web/archive.org/web/20091009113ll/http://www.htc.com/www/product/hero/a-closer-look.html>. (dated 2009) 1 page.
atebits—Tweetie for iPhone [online] [retrieved Sep. 4, 2014]. Retrieved from the Internet: <URL: http://web.archive.org/web/20100825095039/http://www.atebits.com/tweetie-iphone/screenshots/>. (dated 2007-2009) 1 page.
Samsung 19000 Galaxy S review: From outer space—p. 4—GSMArena.com [online] [retrieved Sep. 4, 2014]. Retrieved from the Internet: <URL: http://www.gsmarena.com/samsung_i9000_galazy_s-review-478p4.php>. (dated May 22, 2010) 4 pages.
4 finger swipes on Macbooks amazing [online] [retrieved Sep. 4, 2014]. Retrieved from the Internet: <URL: http://forum.notebookreview.com/apple-mac-os-x/481361-4-finger-swipes-macbooks-amazing.html>. (dated May 4, 2010) 4 pages.
Be still my heart: multi-touch tab switching in Firefox! [online] [retrieved Sep. 4, 2014]. Retrieved from the Internet: <URL: http://www.crunchgear.com/2009/06/30/be-still-my-heart-multi-touch-tab-switching-in-firefox/>. (dated Jun. 30, 2009) 5 pages.
International Search Report/Written Opinion for Application No. PCT/FI2009/050583 dated Apr. 1, 2010 (14 pages).
International Preliminary Report on Patentability/Written Opinion for Application No. PCT/FI2011/050708 dated Feb. 26, 2013.
Office Action for U.S. Appl. No. 13/381,559 dated May 22, 2014.
Office Action for U.S. Appl. No. 13/381,559 dated Dec. 15, 2014.
Office Action for corresponding U.S. Appl. No. 13/381,559 dated Oct. 20, 2015.
Extended European Search Report for European Patent Application No. 09846734.3, dated Apr. 6, 2016, 9 pages.
Office Action for corresponding U.S. Appl. No. 13/381,559 dated Apr. 18, 2016.

* cited by examiner

METHOD AND APPARATUS FOR ADAPTING A CONTENT PACKAGE COMPRISING A FIRST CONTENT SEGMENT FROM A FIRST CONTENT SOURCE TO DISPLAY A SECOND CONTENT SEGMENT FROM A SECOND CONTENT SOURCE

TECHNOLOGICAL FIELD

An example embodiment of the present invention relates generally to adapting a content package and, more particularly, relates to an apparatus, a method and a computer program product configured to adapt a content package comprising a first content segment from a first content source to display a second content segment from a second content source.

BACKGROUND

In order to provide easier or faster information transfer and convenience, telecommunication industry service providers are continually developing improvements to existing communication networks. As a result, wireless communication has become increasingly more reliable in recent years. Along with the expansion and improvement of wireless communication networks, mobile terminals used for wireless communication have also been continually improving. In this regard, due at least in part to reductions in size and cost, along with improvements in battery life and computing capacity, mobile terminals have become more capable, easier to use, and cheaper to obtain. Due to the now ubiquitous nature of mobile terminals, people of all ages and education levels are utilizing mobile terminals to communicate with other individuals or user contacts, receive services and/or share information, media and other content.

With the proliferation of mobile terminals, communications between users have increased. Further, networks may allow mobile terminals to more easily receive and/or store other content. Accordingly, mobile terminals may have access to a wide variety of content. However, the increase in access to content may make it difficult to navigate through the content. For example, a user may have to manually sort through content to find what he or she is looking for. For example, keeping track of friends may involve sorting through social networking services, emails, and media storage sites. However, manual review of content in this manner may not be optimal in that manual review may be time consuming and tedious.

BRIEF SUMMARY

A method, apparatus and computer program product are therefore provided to adapt a content package comprising a first content segment from a first content source to display a second content segment from a second content source.

In an example embodiment, an apparatus comprises at least one processor and at least one memory including computer program code, the at least one memory and the computer program code configured to, with the processor, cause the apparatus to provide for display of a content package comprising a first content segment from a first content source, provide for receipt of a gesture input in a positional relationship to the first content segment, select a second content segment relating to the first content segment from a second content source, and adapt the content package to provide for display of the second content segment.

In an additional example embodiment a method comprises providing for display of a content package comprising a first content segment from a first content source, providing for receipt of a gesture input in a positional relationship to the first content segment, selecting a second content segment relating to the first content segment from a second content source via a processor, and adapting the content package to provide for display of the second content segment.

In a further example embodiment a computer program product comprises at least one computer-readable storage medium having computer-executable program code portions stored therein, the computer-executable program code portions comprising program code instructions providing for display of a content package comprising a first content segment from a first content source, program code instructions providing for receipt of a gesture input in a positional relationship to the first content segment, program code instructions for selecting a second content segment relating to the first content segment from a second content source, and program code instructions for adapting the content package to provide for display of the second content segment.

In a further example embodiment an apparatus comprises means for displaying content, means for receiving a gesture input, means for selecting a second content segment, and means for adapting a content package. Means for displaying content may comprise a user interface and/or a processor, which may be configured to display a content package comprising a first content segment from a first content source. Means for receiving a gesture input may comprise the user interface, a gesture interpreter, and/or the processor, which may be configured to provide for receipt of a gesture input in a positional relationship to the first content segment. Means for selecting a second content segment may comprise a content relationship manager, a content segment selector, and/or the processor, which may be configured to select a second content segment relating to the first content segment from a second content source. Further, means for adapting a content package may comprise a content package adaptor, and/or the processor, which may be configured to adapt the content package to provide for display of the second content segment.

In some embodiments the apparatuses may be further configured to provide for receipt of a second gesture input, and provide for display of a second content package comprising the second content segment from the second content source. The apparatuses may also be configured to provide for receipt of the second gesture input as a continuation of the gesture input. Additionally, the apparatuses may be configured to switch from the first content source to the second content source. Further, the apparatuses may be configured to switch from a first application to a second application. Also, the apparatuses may be configured to increase a displayed size of the second content segment as the gesture input is received. The apparatuses may further comprise user interface circuitry configured to facilitate user control of at least some functions of the apparatus through use of a display, and cause at least a portion of a user interface of the apparatus to be displayed on the display to facilitate user control of at least some functions of the apparatus. The apparatuses may additionally be configured to provide for selection of the second content source from which the second content segment is selected. Similar embodiments of the method and computer program product are also provided. Accordingly, embodiments of the present invention may provide previews of the second content segments and in some embodiments allow the user to switch to the second content source to thereby facilitate browsing of related content segments.

BRIEF DESCRIPTION OF THE SEVERAL VIEWS OF THE DRAWING(S)

Having thus described embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
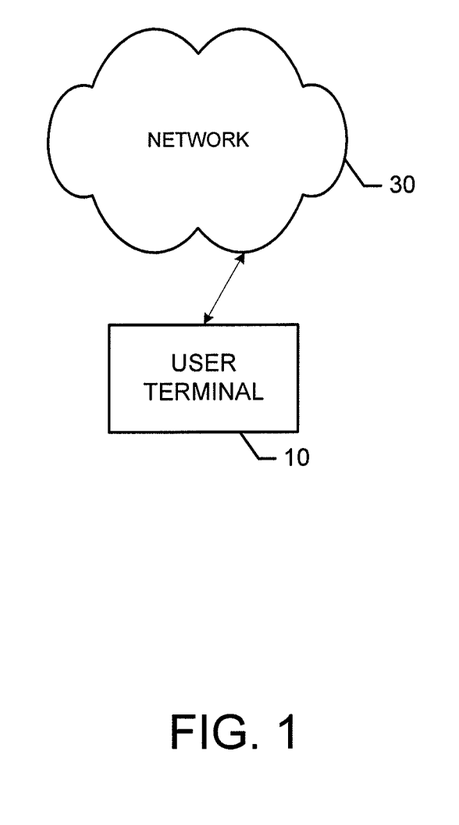
FIG. 1 illustrates a schematic block diagram of a system according to an example embodiment of the present invention.

As indicated above, some embodiments of the present invention may be employed in methods, apparatuses and computer program products configured to adapt a content package comprising a first content segment from a first content source to display a second content segment from a second content source. In this regard, for example, FIG. 1 illustrates a block diagram of a system that may benefit from embodiments of the present invention. It should be understood, however, that the system as illustrated and hereinafter described is merely illustrative of one system that may benefit from an example embodiment of the present invention and, therefore, should not be taken to limit the scope of embodiments of the present invention.

As shown in FIG. 1, a system in accordance with an example embodiment of the present invention may include a user terminal 10. The user terminal 10 may be any of multiple types of fixed or mobile communication and/or computing devices such as, for example, personal digital assistants (PDAs), pagers, mobile televisions, mobile telephones, gaming devices, laptop computers, personal computers (PCs), cameras, camera phones, video recorders, audio/video players, radios, global positioning system (GPS) devices, or any combination of the aforementioned, which employ an embodiment of the present invention.

In some embodiments the user terminal 10 may be capable of communicating with other devices, either directly, or via a network 30. The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. Thus, the network 30 may be a cellular network, a mobile network and/or a data network, such as a local area network (LAN), a metropolitan area network (MAN), and/or a wide area network (WAN), for example, the Internet. In turn, other devices such as processing elements (for example, personal computers, server computers or the like) may be included in or coupled to the network 30. By directly or indirectly connecting the user terminal 10 and the other devices to the network 30, the user terminal and/or the other devices may be enabled to communicate with each other, for example, according to numerous communication protocols including Hypertext Transfer Protocol (HTTP) and/or the like, to thereby carry out various communication or other functions of the mobile terminal and the other devices, respectively. As such, the user terminal 10 and the other devices may be enabled to communicate with the network 30 and/or each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as wireless LAN (WLAN), Worldwide Interoperability for Microwave Access (WiMAX), WiFi, ultra-wide band (UWB), Wibree techniques and/or the like and fixed access mechanisms such as digital subscriber line (DSL), cable modems, Ethernet and/or the like. Thus, for example, the network 30 may be a home network or other network providing local connectivity.

In an example embodiment, an apparatus 50 is provided that may be employed by devices performing example embodiments of the present invention. The apparatus 50 may be embodied, for example, as any device hosting, including, controlling or otherwise comprising the user terminal 10. However, embodiments may also be embodied on a plurality of other devices such as for example where instances of the apparatus 50 may be embodied on the network 30. As such, the apparatus 50 of FIG. 2 is merely an example and may include more, or in some cases less, than the components shown in FIG. 2.

Figure 2:
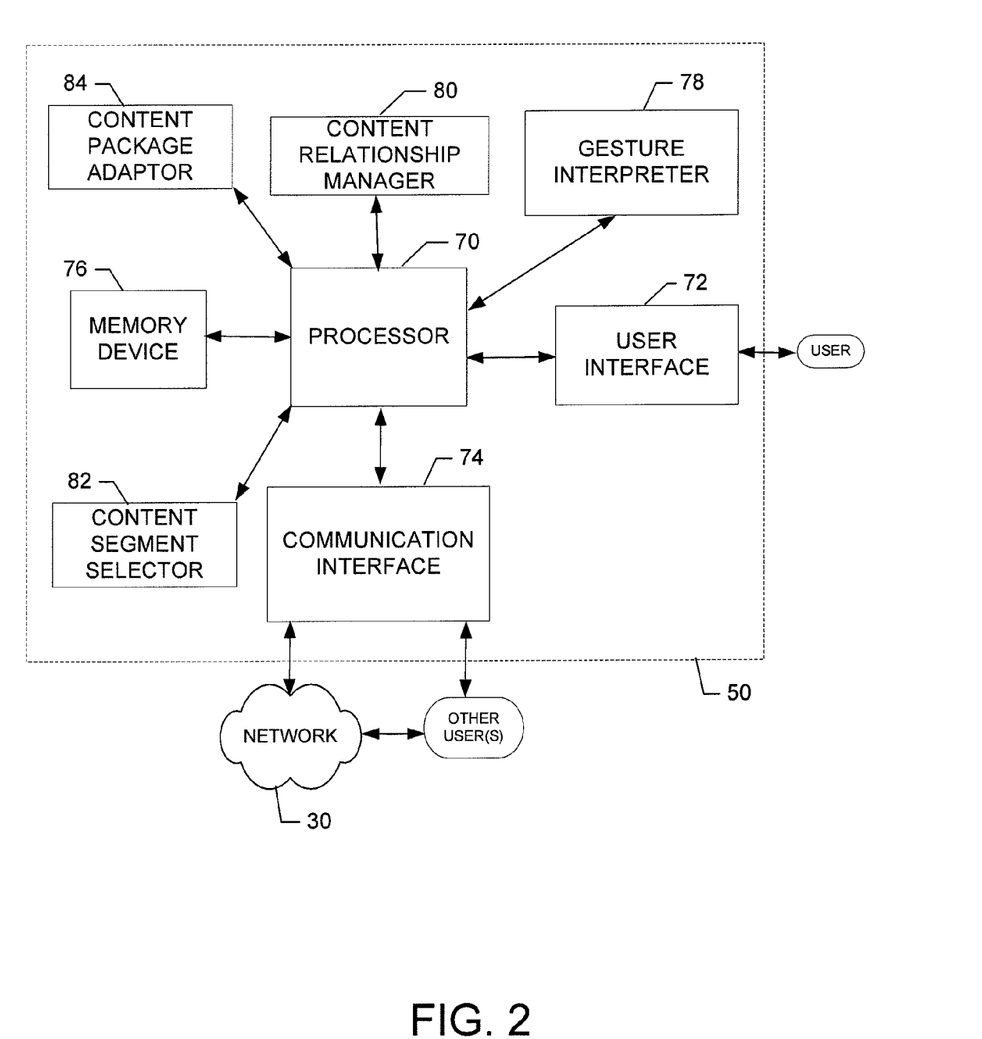
FIG. 2 illustrates a schematic block diagram of an apparatus configured to adapt a content package comprising a first content segment from a first content source to display a second content segment from a second content source according to an example embodiment of the invention.

With further regard to FIG. 2, the apparatus 50 may be configured to adapt a content package comprising a first content segment from a first content source to display a second content segment from a second content source. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, files, applications, instructions or the like. For example, the memory device 76 could be configured to buffer input data for processing by the processor 70. Additionally or alternatively, the memory device 76 could be configured to store instructions for execution by the processor 70.

As mentioned above, the apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 70 may be embodied in a number of different ways. For example, the processor 70 may be embodied as one or more of various processing means such as a coprocessor, a microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a hardware accelerator, a special-purpose computer chip, or the like. In an example embodiment, the processor 70 may be configured to execute instructions stored in the memory device 76 or otherwise accessible to the processor. Alternatively or additionally, the processor 70 may be configured to execute hard coded functionality. As such, whether configured by hardware or software methods, or by a combination thereof, the processor 70 may represent an entity (for example, physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor to perform the algorithms and/or operations described herein when the instructions are executed. However, in some cases, the processor 70 may be a processor of a specific device (for example, a mobile terminal or network device such as a server) adapted for employing embodiments of the present invention by further configuration of the processor by instructions for performing the algorithms and/or operations described herein. The processor 70 may include, among other things, a clock, an arithmetic logic unit (ALU) and logic gates configured to support operation of the processor.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 74 may include hardware and/or software for supporting communication mechanisms such as BLUETOOTH®, Infrared, UWB, WiFi, and/or the like, which are being increasingly employed in connection with providing home connectivity solutions.

The user interface 72 may be in communication with the processor 70 to receive an indication of a user input at the user interface and/or to provide an audible, visual, mechanical or other output to the user. As such, the user interface 72 may include, for example, a keyboard, a mouse, a joystick, a display, a touch screen, a microphone, a speaker, or other input/output mechanisms.

The processor 70 may comprise user interface circuitry configured to control at least some functions of one or more elements of the user interface 72, such as, for example, the speaker, the ringer, the microphone, the display, and/or the like. The processor 70 and/or user interface circuitry comprising the processor 70 may be configured to control one or more functions of one or more elements of the user interface 72 through computer program instructions (for example, software and/or firmware) stored on a memory accessible to the processor 70 (for example, memory device 76, and/or the like).

In some embodiments the apparatus 50 may further include a gesture interpreter 78. The processor 70 or other circuitry may be embodied as, include or otherwise control the gesture interpreter 78. The gesture interpreter 78 may be configured to interpret the receipt of a gesture input. For example, the user interface 72 may comprise a touch screen which is configured to receive inputs thereon. Thereby, the gesture interpreter 78 may interpret the gesture inputs to determine what commands are being inputted by the user. By way of example, certain gesture inputs may correspond to predefined commands. Further, in some embodiments gesture inputs may correspond to different predefined commands depending on where the gesture inputs are inputted with respect to a displayed content package. For example, a gesture input may correspond to a different predefined command depending on where on the displayed content package the gesture input is received. Thus, in some embodiments the gesture interpreter 78 may be configured to interpret the receipt of a gesture input based on a positional relationship of the gesture input to a content segment. For example, a gesture input received on a content segment may be interpreted by the gesture interpreter 78 to relate specifically to the content segment on which the gesture input is received. However, in other embodiments the positional relationship need not be directly on the content segment, but instead may be adjacent, beside, above, below, or in other positional relationships, which may be predefined, with respect to the content segment. A gesture input may be directional, circular, or contain shapes and/or the like in some embodiments. Further, in some embodiments the gesture interpreter 78 may be configured to receive a second gesture input, which may be a continuation of the gesture input (which may also be referred to as a "first" gesture input"), and interpret the second gesture input. Accordingly, the gesture interpreter 78 may interpret gesture inputs as inputted by a user to determine what commands are associated therewith.

In some embodiments the apparatus 50 may further include a content relationship manager 80. The processor 70 or other circuitry may be embodied as, include or otherwise control the content relationship manager 80. The content relationship manager 80 may be configured to determine and manage the relationships between various content segments which are stored on or otherwise accessible to the apparatus 50. Content segments may comprise portions of the content package which is displayed. Thus, content segments may comprise contact information, photos, videos, songs, and/or other types of information and/or data which may be displayed.

The apparatus 50 may store or otherwise have access to a plurality of user contacts and groups of user contacts in some embodiments. User contacts may comprise persons, businesses, or other entities for which contact information may be associated therewith. For example, user contacts may have associated therewith contact information such as names, addresses, phone numbers, fax numbers, email addresses, user names, photos of the user contacts or other avatars, and information from social networking services. The content relationship manager 80 may thereby use the contact information to associate various content segments therewith. For example, the content relationship manager 80 may determine that a message posted on a social networking site is related to an email because the email and the message originate from the same user contact. In some instances the contact information itself may comprise content segments. For example, the content relationship manger 80 may determine that there is a relationship between a photo posted on a media sharing site and a phone number stored on the phone because the photo was taken by or depicts a user contact, and the phone number is part of the contact information for the user contact.

The content relationship manager 80 may further determine relationships of content segments which may not be related to user contacts in some embodiments. For example, the content relationship manager 80 may determine that two songs stored on or otherwise accessible to the apparatus 50 are related to one another because they are performed by the same artist and/or are included in the same album. The content relationship manager 80 may determine that relationships exist for various other types of content segments such as between movies which include the same actor or which were produced by the same director. By way of further example, the content relationship manager 80 may determine that a relationship exists between a shared photo and the comments directed thereto and views associated therewith on a media sharing site. Accordingly, the content relationship manager 80 may determine and manage relationships between these and various other types of content segments.

Further, in some example embodiments the content relationship manager 80 may use a content segment as a lookup value or a search term to access or search for related content segments. In this regard, the content relationship manager 80 may find relationships for a user contact name, song name, calendar information, date/time, or other content segments.

In some embodiments the apparatus 50 may further include a content segment selector 82. The processor 70 or other circuitry may be embodied as, include or otherwise control the content segment selector 82. The content segment selector 82 may be configured to select a second content segment relating to the first content segment from a second content source. The content segment selector 82 may use the relationship information determined by the content relationship manager 80 to select the second content segment. Further, in some embodiments the content segment selector 82 may allow the user to select the second content segment and/or the second content source from which the second content segment is received.

As mentioned above, the second content segment may be from a second content source. Content sources comprise sources of the content segments. In some embodiments content sources may comprise portions of data or information stored within or accessible to applications. For example, within the context of a media player application, a first content source may list songs (which may comprise the first content segments), whereas a second content source may list albums (which may comprise the second content segments). In some example embodiments the content segment may be pre-installed on an exemplary device (e.g. music residing on a memory card/internal memory, or any preinstalled data), fetched or transferred from a content source such as a network site or another device (e.g. the data may have previously been downloaded), or fetched or transferred as a response to a gesture input (e.g. data may be accessed as the gesture input is received).

However, by way of further example, the first and second content sources may comprise separate applications in some embodiments. For example, a photo application may comprise a first content source which may display a plurality of thumbnail images (which may comprise the first content segments). Further, a media sharing application may comprise the second content source which may list related information such as the number of views of the photos and/or comments on the photo (which may comprise the second content segments). Accordingly, the content segment selector 82 may select content segments from a variety of content sources.

As mentioned above, in some embodiments the content relationship manager 80 may act like a search engine with the content segments acting as search terms. In an example embodiment a calendar application is accessed and a day-view, week-view or a month-view may be presented. For example, when a gesture input begins at a time shown on the view, e.g. Thursday, 12$^{th}$ August, 14:00 and the gesture input ends at 17:00, the content segments related to this timeframe (3 hours) are revealed. Accordingly, for example, the social networking sites' content posted, created, or sent during that time may be shown. The content may be searched and/or transferred on-the-fly when the gesture is performed, or may be shown directly when previously fetched/transferred from a second content source. In another example embodiment a clock application or a clock face may be shown. When a gesture is made over/above/on/adjacent or otherwise in a predefined positional relationship to a clock, the time may be used when selecting a content segment. For example, when a gesture input begins at 14:00 on a clock face and ends at 17:00 the 3-hour timeframe may be used for looking up the content segment from a content source and then displayed on the screen.

In an example embodiment a tag or metadata information relating to a content segment may be used for showing a related content segment from a related content source. For example, when a gesture input, such as a swipe gesture, is received over a photo, the metadata may be accessed and another content source may be searched and second content segment may be displayed. For example, when a user swipes over a person's face in a photo, the social networking sites' content related to said person may be shown.

Selection of a second content segment may occur so that the apparatus 50 may adapt the content package using the second content segment. In this regard, the apparatus 50 may further comprise a content package adaptor 84. The processor 70 or other circuitry may be embodied as, include or otherwise control the content package adaptor 84. The content package adaptor 84 may be configured to adapt the content package to provide for display of the second content segment. In this regard, as will be described in detail below, the content package adaptor 84 may adapt the content package by displaying a preview of the second content segment. The content package adaptor 84 may further adapt the content package by providing for display of a second content package comprising the second content segment. In some embodiments adapting the content package may include switching from the first content source to the second content source such as by switching from a first application to a second application (e.g. by closing the first application and opening the second application).

Figure 3:
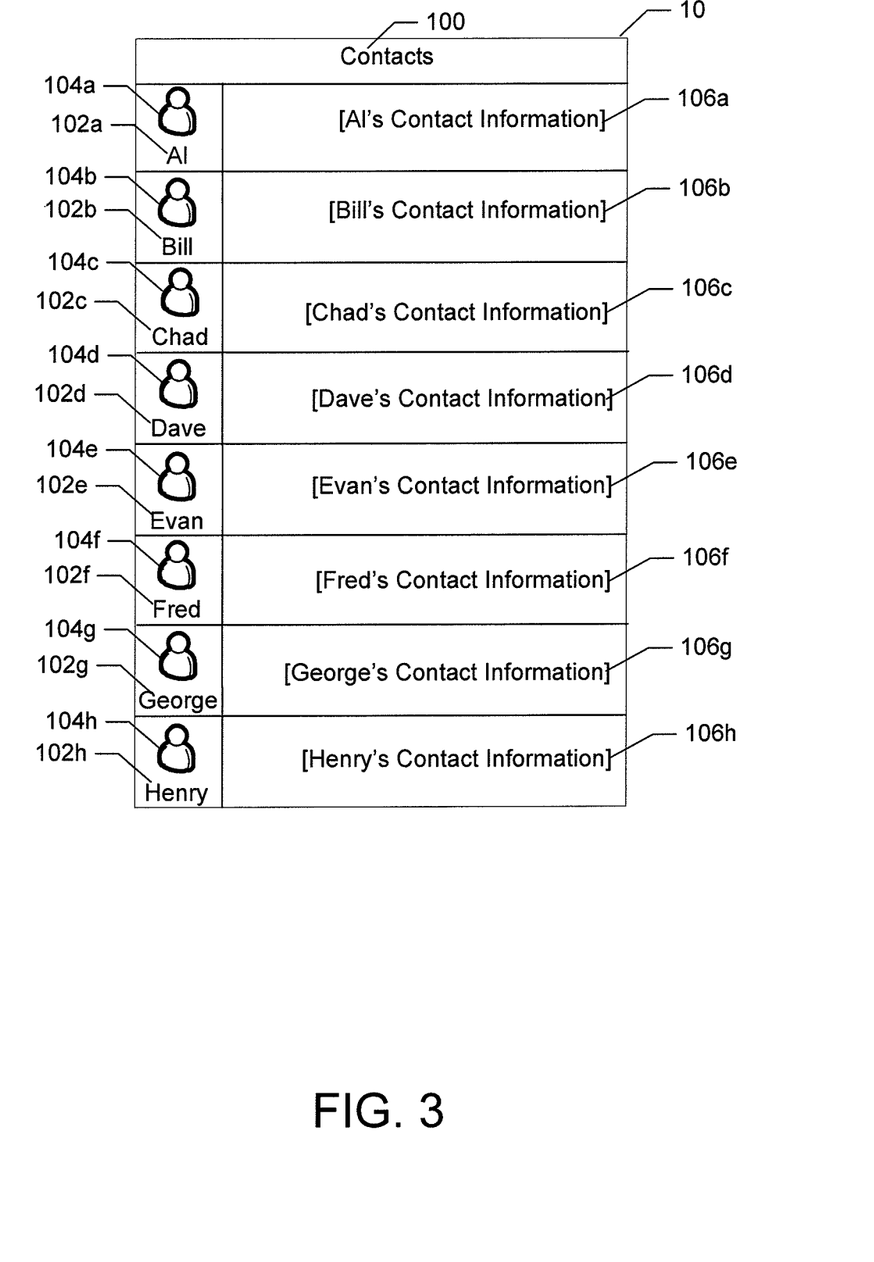
FIG. 3 illustrates an embodiment of a user terminal employing the apparatus of FIG. 2 to display a content package comprising a first content segment according to an example embodiment of the present invention.

An example embodiment of adapting a content package is illustrated in FIGS. 3-7. FIG. 3 illustrates the user terminal 10, which may embody the apparatus 50, when the user terminal is running a user contacts application 100. In this regard, the user terminal 10 is illustrated providing for display of a content package comprising a plurality of content segments associated with a plurality of user contacts 102a-h. In particular, the content package is illustrated as comprising content segments in the form of an avatar 104a-h and user contact information 106a-h for each user contact 102a-h. Thus, the user terminal 10 may provide for display of a content package comprising a first content segment (e.g. the user contact information 106a-h and/or the avatars 104a-h). In particular, the user interface 72 may provide for display of the content package.

Figure 4:
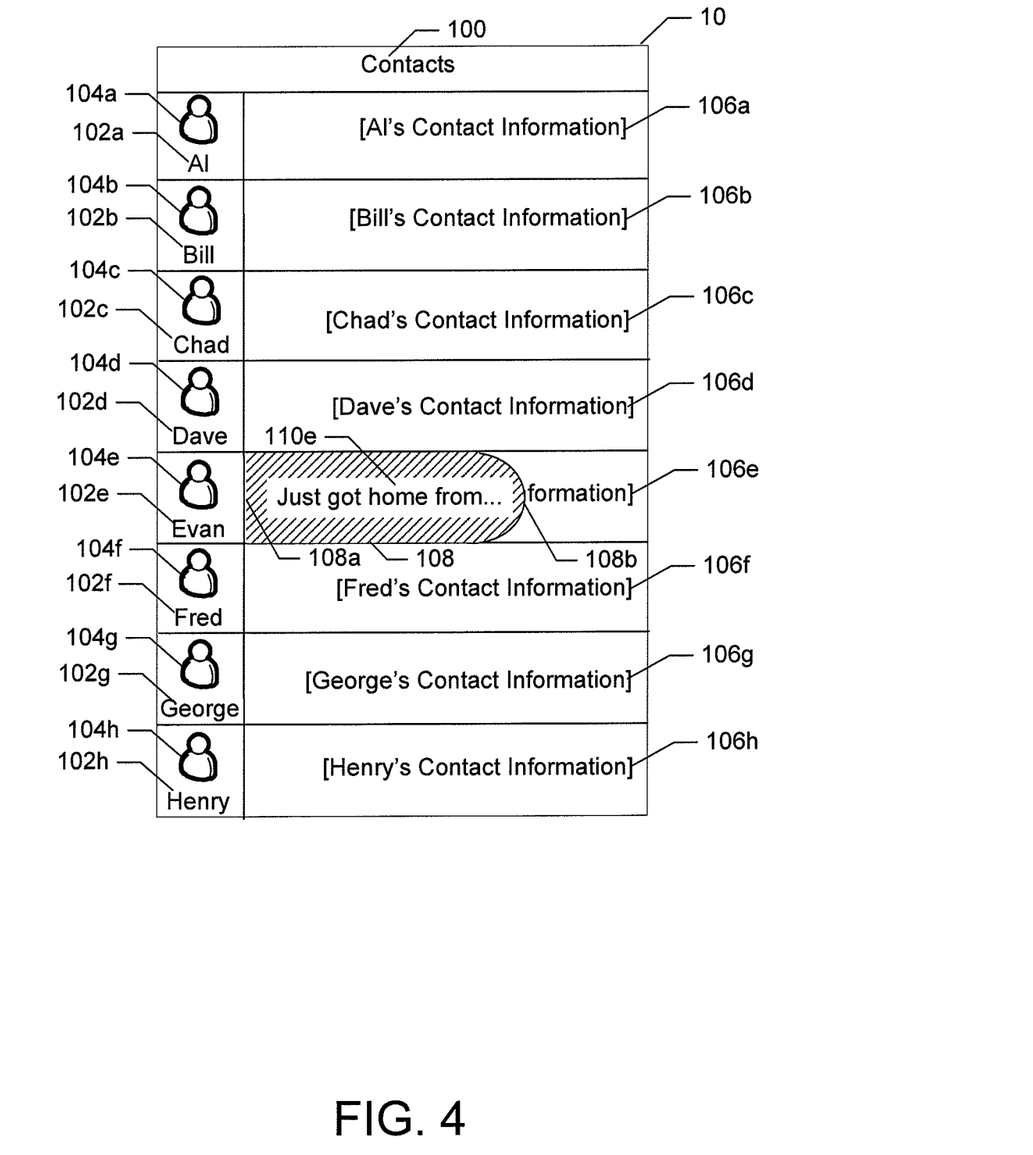
FIG. 4 illustrates the user terminal of FIG. 3 employing the apparatus of FIG. 2 to receive a gesture input and display a second content segment according to an example embodiment of the present invention.

As illustrated in FIG. 4, the user terminal 10 may be configured to provide for receipt of a gesture input on or in another positional relationship with one or more of the first content segments. For example, in the illustrated embodiment the user terminal is illustrated as receiving a gesture input in a highlighted area 108 on the user contact information 106e for user contact Evan 102e. Thereby, the user contact information 106e may comprise the first content segment. For example, the gesture input may comprise a swipe across the user contact information 106e beginning at a starting point 108a and extending to an end point 108b. However, various other input gestures may be predefined and used in other embodiments. The gesture input may be received by the user interface 72, for example through use of a touch screen in the illustrated embodiment, or by making hand or finger gestures above the screen surface without actually touching the screen.

Further, as described above, the gesture interpreter 78 may interpret the gesture input. In the illustrated embodiment the gesture interpreter 78 has interpreted the gesture input to mean that the user wants to invoke the predefined function of adapting the content package. Accordingly, the content package adaptor 84 may adapt the content package to provide for display of a second content segment relating to the first content segment from a second content source. In the illustrated embodiment the second content segment comprises a message 110e from a social networking application. In this regard, the content relationship manager 80 may have determined that the message 110e relates to the user contact 102e Evan. Thereby, the user may be provided with a quick and easy way to preview the message 110e. For example, the message 110e may comprise a status update posted by user contact 102e Evan, and hence the user may now know whether or not it is a good time to call Evan.

In some embodiments the apparatus 50 may have access to a plurality of content segments from other content sources relating to the first content segment. Accordingly, the content segment selector 82 may select the second content source. For example, the content segment selector 82 may select the content source based on frequency of use of the content sources. Alternatively, the content segment selector 82 may select the second content source based on which content source has the most recent content segment related to the first content segment. For example, if user contact Evan 102e more recently posted a message on a social networking site as compared to when Evan last posted a photo on a media sharing site, the content segment selector 82 may select the social networking site as the second content source and the message posted thereon as the second content segment. The content segment selector 82 may also select the second content source based on any other type of device usage history. Further, in other embodiments the content segment selector 82 may select the second content source based on contextual information of the user and/or the apparatus 50 such as location, time of day, physical conditions around the device, present activities, etcetera. However, in other embodiments the content segment selector 82 may provide for selection of the second content source from which the content segment is received. Thereby, the user may determine which content source the second content segment is received from. For example, the user may be more interested in messages posted by user contacts on a social networking site than pictures posted by the user contacts on a media sharing site. Accordingly, the second content segment and the second content source may be selected by the content segment selector 82 using a variety of methods and techniques in various embodiments.

Figure 5:
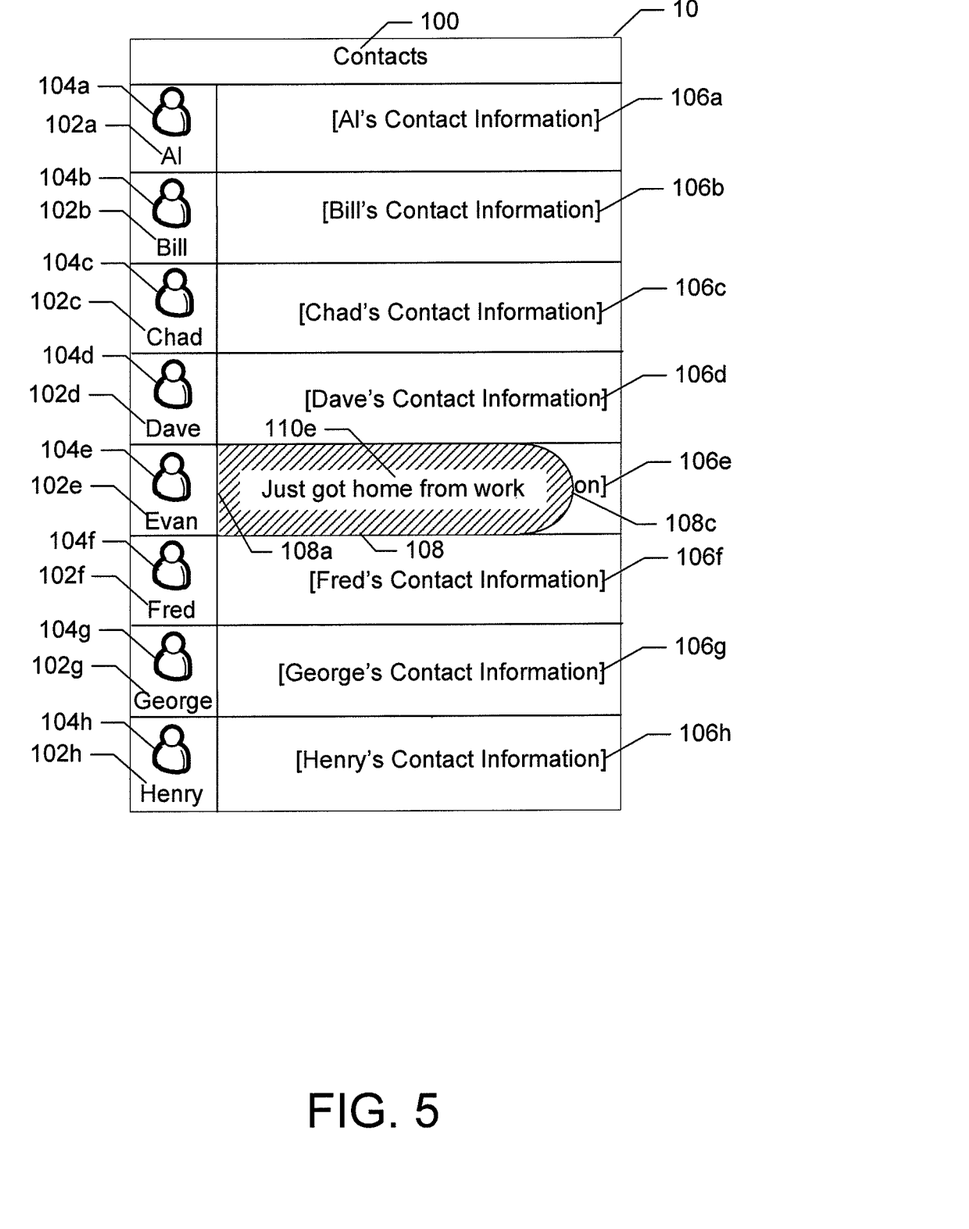
FIG. 5 illustrates the user terminal of FIG. 3 employing the apparatus of FIG. 2 to further receive the gesture input and increase a displayed size of the second content segment according to an example embodiment of the present invention.

FIG. 5 illustrates the user terminal 10 as the user continues the gesture input of swiping across Evan's contact information 106e. In this regard, the gesture input now extends past the end point 108b to a further end point 108c. As illustrated, the content package adaptor 84 may be configured to increase a displayed size of the second content segment as the gesture input is received. Thereby, in some embodiments a larger portion of the second content segment may be displayed as the gesture input is received. For example, the entirety of the message 110e may be displayed when the gesture input extends to the further end point 108c. Note that when second content segments are displayed, the display may happen directly, by fading in, by blinds-like effect whereby the content segment may be revealed part-by-part, and/or by various other embodiments of methods for revealing content as may be understood by one having skill in the art.

Figure 6:
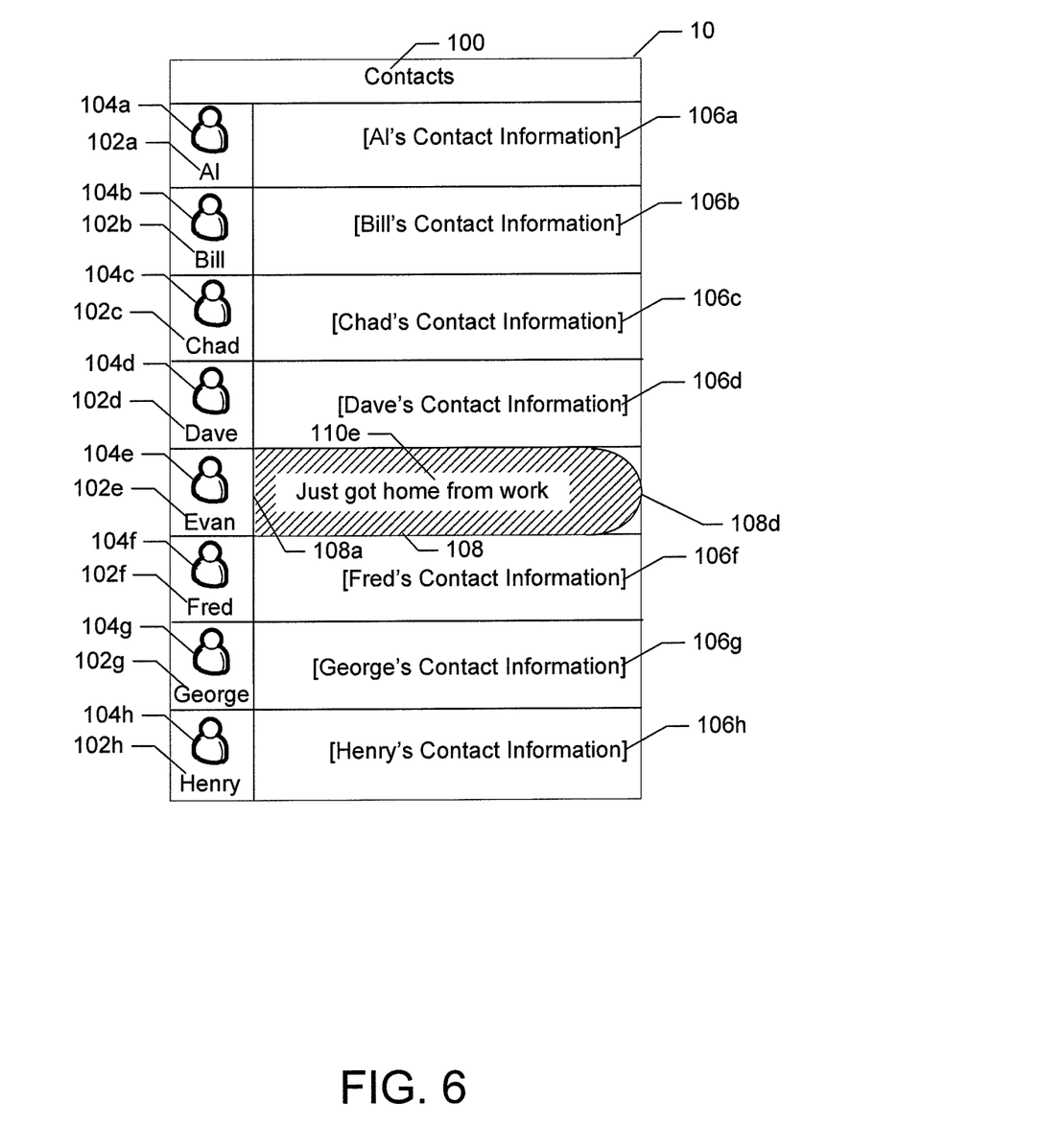
FIG. 6 illustrates the user terminal of FIG. 3 employing the apparatus of FIG. 2 to receive a second gesture input according to an example embodiment of the present invention.

The apparatus 50 may be further configured to provide for receipt of a second gesture input. Gestures that will be considered a second gesture input may be predefined. For example, as illustrated in FIG. 6, a second gesture input may extend to the end of the display area 108d. In some embodiments the apparatus 50 may be configured to provide for receipt of the second gesture input as a continuation of the gesture input (the first gesture input). In this regard the second gesture may comprise a continuous extension of the gesture input. For example, the second gesture input may be input by continuing a swipe past the further end point 108c to the end of the display area 108d. Thus, in some embodiments the gesture interpreter 78 may be configured to interpret a continuous swipe as both a gesture input and a second gesture input when the swipe extends beyond a predetermined length or for more than a predetermined period of time. Further, in some embodiments the gesture interpreter 78 may consider a gesture input followed by a pause and then a second gesture input as comprising a continuation of the gesture input. However, in various other embodiments the gesture interpreter 78 may be configured to interpret a variety of other inputs as comprising either the gesture input or the second gesture input. Thus, in other embodiments the second gesture input may comprise a different type of gesture input and/or a gesture input on a different location on the content segment or other part of the content package. Accordingly, the gesture input and the second gesture input may comprise a variety of different inputs in various embodiments.

Figure 7:
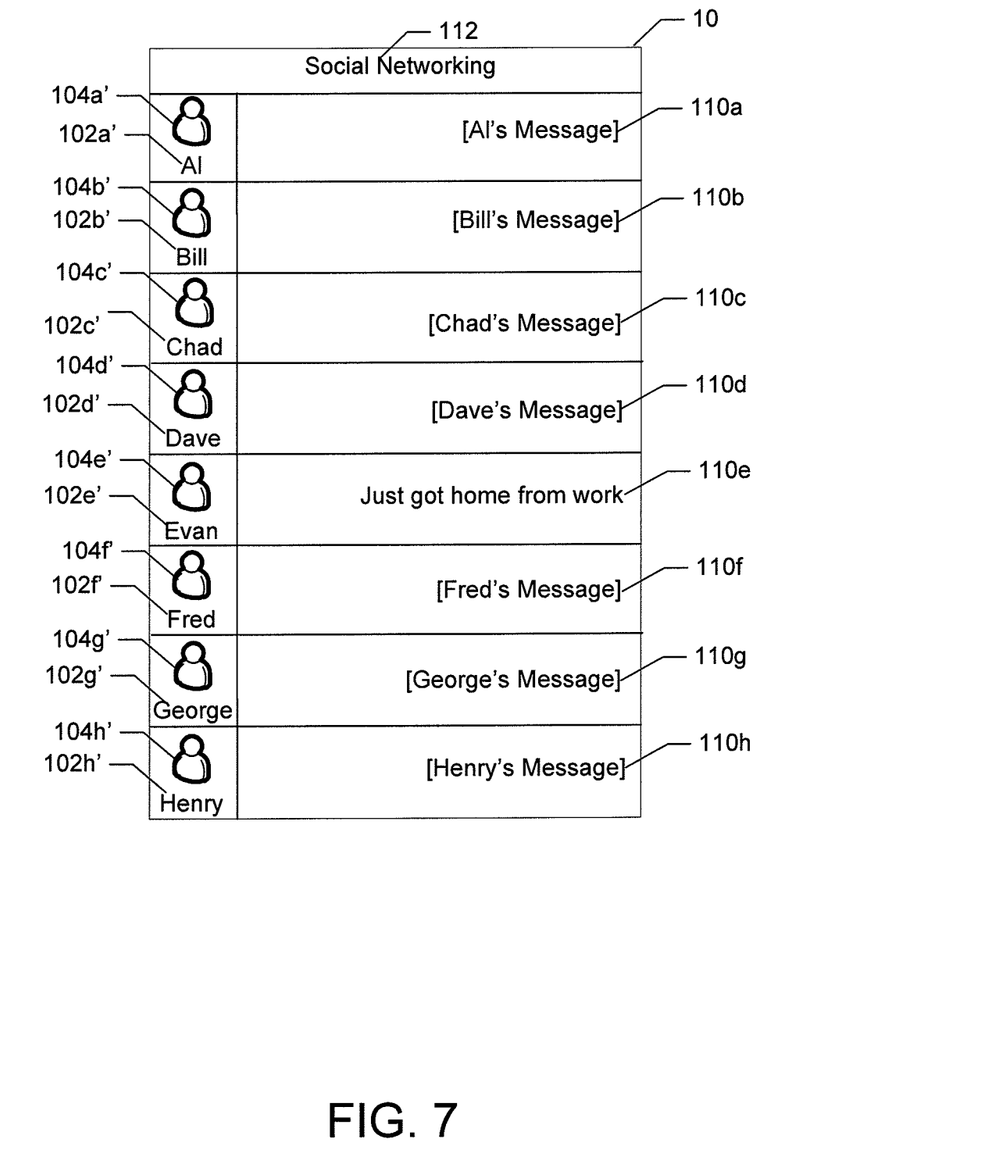
FIG. 7 illustrates the user terminal of FIG. 3 employing the apparatus of FIG. 2 to display a second content package comprising the second content segment according to an example embodiment of the present invention.

In some embodiments the apparatus 50 may be configured to provide for display of a second content package comprising the second content segment from the second content source. For example, FIG. 7 illustrates the user terminal 10 when the user terminal 10 has switched from the user contacts application 100 to a social networking application 112. Thus, in some embodiments the content package adaptor 84 may be configured to adapt the content package by switching from a first content source (e.g. the contacts application 100) to a second content source (e.g. the social networking application 112) and in some embodiments, such as the embodiment illustrated in FIGS. 3-7 this may comprise switching from a first application to a second application. However, in other embodiments switching from the first content source to the second content source may comprise switching between webpages, switching from an application to a webpage or vice versa, etcetera.

In the embodiment illustrated in FIG. 7, the social networking application 112 displays a plurality of messages 110a-h from a plurality of user contacts 102a-h'. The user contacts 102a-h' may be the same as the user contacts 102a-h from the contacts application 100 or different user contacts. For example, not all of the user contacts 102a-h from the user contacts application 100 may be registered with the social networking service to which the social networking application 112 relates. Further, the avatars 104a-h' which may be displayed by the social networking application 112 may be the same or different than the avatars 104a-h from the user contacts application 100.

However, the message from Evan 110e may be the same in both the user contacts application 100 and the social networking application 112. In this regard, the second content package may comprise the second content segment which the content package was previously adapted to display. Thus, the user may be provided with a preview of the second content segment within the original content package as the gesture input is received, and the user may then be provided with a second content package comprising the second content segment when the second gesture input is received. Accordingly, a user may be provided with a convenient way to browse related content segments by previewing content segments and then switching content sources if so desired. In some embodiments the apparatus 50 may be further configured to receive gesture inputs in positional relationships to a plurality of the first content segments and thereby the user may be provided with multiple related second content segments at the same time. Further, in some embodiments a single predefined gesture input may be configured to provide related second content segments for each of the first content segments. Thereby, in some embodiments the apparatus 50 may be configured to provide for display of two or more of the second content segments at the same time such that the user may be provided with multiple second content segments. For example, the user may be provided with second content segments relating to all the user contacts presently displayed on the screen.

Figure 8:
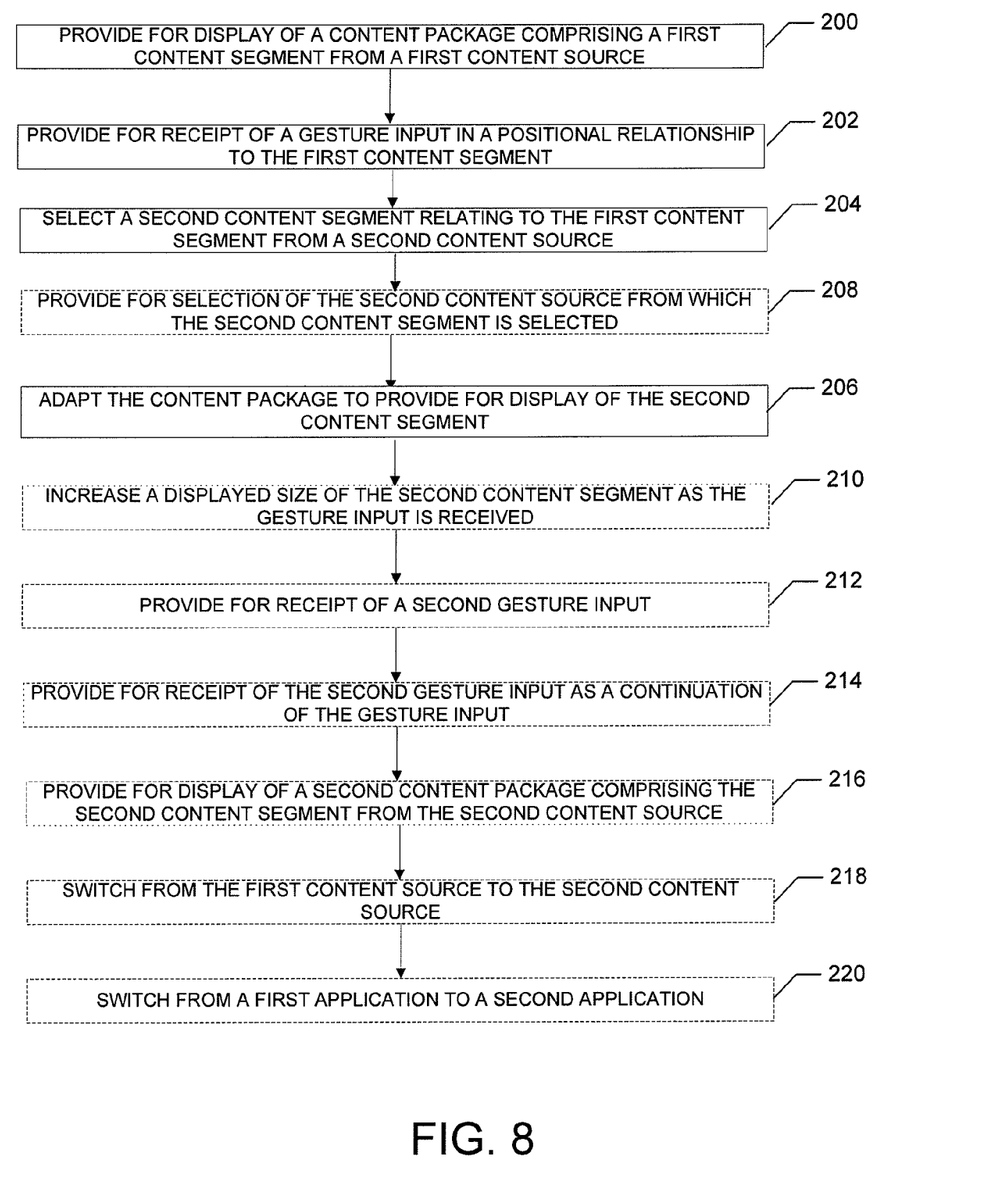
FIG. 8 illustrates a flowchart of the operations performed in adapting a content package comprising a first content segment from a first content source to display a second content segment from a second content source according to an example embodiment of the present invention.

In terms of methods associated with embodiments of the present invention, the above-described apparatus 50 or other embodiments of apparatuses may be employed. In this regard, FIG. 8 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by a computer program product including computer program instructions. In this regard, the computer program instructions which embody the procedures described above may be stored by a memory device and executed by a processor of an apparatus. As will be appreciated, any such computer program instructions may be loaded onto a computer or other programmable apparatus (for example, hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method includes providing for display of a content package comprising a first content segment from a first content source at operation 200. Further, the method may include providing for receipt of a gesture input in a positional relationship to the first content segment at operation 202. Additionally, the method may include selecting a second content segment relating to the first content segment from a second content source at operation 204. Also, the method may include adapting the content package to provide for display of the second content segment at operation 206.

In some embodiments, certain ones of the above-described operations (as illustrated in solid lines in FIG. 8) may be modified or further amplified. In some embodiments additional operations may also be included (some examples of which are shown in dashed lines in FIG. 8). It should be appreciated that each of the modifications, optional additions or amplifications may be included with the above-described operations (200-206) either alone or in combination with any others among the features described herein. As such, each of the other operations as will be described herein may be combinable with the above-described operations (200-206) either alone or with one, more than one, or all of the additional operations in any combination.

For example, the method may further comprise providing for selection of the second content source from which the second content segment is selected at operation 208. Thereby, the user may select the second content source such that the content segment selector 82 may select the type of second content segment which he or she desires. The method may additionally include increasing a displayed size of the second content segment as the gesture input is received at operation 210. Accordingly, in some embodiments more of the second content segment may be displayed.

The method may further include providing for receipt of a second gesture input at operation 212. In some embodiments the method may also include providing for receipt of the second gesture input as a continuation of the gesture input at operation 214. The method may additionally comprise providing for display of a second content package comprising the second content segment from the second content source at operation 216. In some embodiments the method may further include switching from the first content source to the second content source at operation 218 and also the method may include switching from a first application to a second application at operation 220.

In an example embodiment, an apparatus for performing the method of FIG. 8 and other methods described above may comprise a processor (for example, the processor 70) configured to perform some or each of the operations (200-220) described above. The processor may, for example, be configured to perform the operations (200-220) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-220 may comprise, for example, the processor 70, the user interface 72, the communication interface 74, the gesture interpreter 78, the content relationship manager 80, the content segment selector 82, and/or the content package adaptor 84, as described above. However, the above-described portions of the apparatus 50 as they relate to the operations of the method illustrated in FIG. 8 are merely examples, and it should be understood that various other operations may be possible.

In some embodiments the operation 200 of providing for display of a content package comprising a first content segment may be conducted by means (e.g. means for displaying content), such as the user interface 72, and/or the processor 70. Further, the operation 202 of providing for receipt of a gesture input in a positional relationship to the first content segment may be conducted by means (e.g. means for receiving a gesture input), such as the user interface 72, the gesture interpreter 78, and/or the processor 70. Additionally, the operation 204 of selecting a second content segment relating to the first content segment from a second content source may be conducted by means (e.g. means for selecting a second content segment), such as the content relationship manager 80, the content segment selector 82, and/or the processor 70. Also, the operation 206 of adapting the content package to provide for display of the second content segment may be conducted by means (e.g. means for adapting a content package), such as the content package adaptor 84, and/or the processor 70.

Additionally, the operation 208 of providing for selection of the second content source from which the second content segment is selected may be conducted by means, such as the user interface 72, the content relationship manager 80, the content segment selector 82, and/or the processor 70. Further, the operation 210 of increasing a displayed size of the second content segment as the gesture input is received may be conducted by means, such as the content package adaptor 84, and/or the processor 70. Additionally, the operation 212 of providing for receipt of a second gesture input and/or the operation 214 of providing for receipt of the second gesture input as a continuation of the gesture input may be conducted by means, such as the user interface 72, the gesture interpreter 78, and/or the processor 70. Further, the operation 216 of providing for display of a second content package comprising the second content segment from the second content source, the operation 218 of switching from the first content source to the second content source, and/or the operation 220 of switching from a first application to a second application may be conducted by means, such as the user interface 72, the content relationship manager 80, the content segment selector 82, the content package adaptor 84, and/or the processor 70.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the processor, cause the apparatus to:

cause display of a) a content package comprising a first content segment from a first content source, and b) a plurality of other content packages each comprising respective displayed content segments from the first content source;

receive an indication of a first gesture input in a positional relationship to the first content segment;

identify a second content segment relating to the first content segment from a second content source;

in response to the indication of the first gesture input, gradually adapt the content package, causing display of at least a portion of the second content segment;

receive a second indication, wherein the second indication is a gradual extension of the first input gesture; and in response to the second indication, cause the content package to be further gradually adapted to reveal at least an additional portion of the second content segment, wherein the gradual adaption of the content package is performed simultaneously and proportionately gradually to the gradual extension of the first input gesture such that the first content segment from the first content source is gradually hidden and the second content segment from the second content source is gradually further revealed from beneath the first content segment, and while the gradual adaptation of the content package is performed, the respective displayed content segments from the first content source remain displayed.

2. The apparatus of claim 1 wherein the first content segment and the second content segment are related by a common identifying field.

3. The apparatus of claim 2, wherein the at least one memory and the computer program code are further configured to cause the apparatus to:

receive an indication of a selection of the second content segment; and in response to the selection of the second content segment, launch an associated application.

4. The apparatus of claim 1, wherein the second content segment includes a media type different from a media type of the first content segment.

5. The apparatus of claim 1, wherein the at least one memory and the computer program code are further configured to cause the apparatus to:

cause display of a plurality of content packages, each comprising a plurality of first content segments from a first content source, wherein the first gesture input further indicates a selection of one of the first content segments and respective content package, and wherein after the selected content is gradually adapted to display the second content segment, the non-selected first content segments remain displayed.

6. The apparatus of claim 1, wherein the first content segments comprise contact information stored on a device, and the second content source is external from the device.

7. The apparatus of claim 1, wherein the gradually adaption of the content package is performed simultaneously and proportionately gradually to the gradual extension of the first input gesture.

8. The apparatus of claim 1, wherein the second content source is identified based on a frequency of use.

9. The apparatus of claim 1, wherein the second content source is identified based on an update time.

10. A method, comprising:

causing display of a) content package comprising a first content segment from a first content source, and b) a plurality of other content packages each comprising respective displayed content segments from the first content source;

receiving an indication of a first gesture input in a positional relationship to the first content segment;

identifying, with a processor, a second content segment relating to the first content segment from a second content source;

in response to the indication of the first gesture input, gradually adapting the content package, causing display of the at least a portion of second content segment;

receiving a second indication, wherein the second indication is a gradual extension of the first input gesture; and in response to the second indication, causing the content package to be further gradually adapted to reveal at least an additional portion of the second content segment, wherein the gradual adaption of the content package is performed simultaneously and proportionately gradually to the gradual extension of the first input gesture such that the first content segment from the first content source is gradually hidden and the second content segment from the second content source is gradually further revealed from beneath the first content segment, and while the gradual adaptation of the content package is performed, the respective displayed content segments from the first content source remain displayed.

11. The method of claim 10, wherein the first content segment and the second content segment are related by a common identifying field.

12. The method of claim 10, further comprising:

receiving an indication of a selection of the second content segment; and in response to the selection of the second content segment, launching an associated application.

13. The method of claim 10, wherein the second content segment includes a media type different from a media type of the first content segment.

14. The method of claim 10, wherein gradually adapting the content package comprises providing a preview of the second content segment and causing the content package to be further gradually adapted comprises launching a second application associated with the second content segment and different from a first application associated with the first content segment.

15. The method of claim 10, further comprising:

causing a greater portion of the second content segment to be revealed in an area previously used to display the first content segment, such that a portion of the first content segment is no longer displayed.

16. A computer program product comprising at least one non-transitory computer-readable storage medium having computer-executable program code portions stored therein, the computer-executable program code portions comprising program code instructions for:

causing display of a) a content package comprising a first content segment from a first content source, and b) a plurality of other content packages each comprising respective displayed content segments from the first content source;

receiving an indication of a first gesture input in a positional relationship to the first content segment;

identifying a second content segment relating to the first content segment from a second content source;

in response to the indication of the first gesture input, gradually adapting the content packaging, causing display of at least a portion of the second content segment;

receiving a second indication, wherein the second indication is a gradual extension of the first input gesture; and in response to the second indication, causing the content package to be further gradually adapted to reveal at least an additional portion of the second content segment, wherein the gradual adaption of the content package is performed simultaneously and proportionately gradually to the gradual extension of the first input gesture such that the first content segment from the first content source is gradually hidden and the second content segment from the second content source is gradually further revealed from beneath the first content segment, and while the gradual adaptation of the content package is performed, the respective displayed content segments from the first content source remain displayed.

17. The computer program product of claim 16, wherein the first content segment and second content are related by a common identifying field.

18. The computer program product of claim 16, wherein the computer-executable program code portions further comprise program code instructions for:

receiving an indication of a selection of the second content segment; and in response to the selection of the second content segment, launching an associated application.

19. The computer program product of claim 16, wherein the second content segment includes a media type different from a media type of the first content segment.

\* \* \* \* \*